(12) United States Patent
Thalapaneni et al.

(10) Patent No.: US 8,369,832 B2
(45) Date of Patent: Feb. 5, 2013

(54) SYSTEMS AND METHODS FOR MANAGING INFORMATION IN MOBILE DEVICES

(75) Inventors: Guru Thalapaneni, Woodside, CA (US); Ramana Anuganti, Santa Clara, CA (US); Kumar M. Ranganath, Bangalore (IN); Rajeswari Aluri, Bangalore (IN)

(73) Assignee: Remoba, Inc., Santa Clara, CA (US)

( * ) Notice: Subject to any disclaimer, the term of this patent is extended or adjusted under 35 U.S.C. 154(b) by 949 days.

(21) Appl. No.: 12/029,779

(22) Filed: Feb. 12, 2008

(65) Prior Publication Data

US 2009/0029676 A1 Jan. 29, 2009

Related U.S. Application Data

(60) Provisional application No. 60/901,830, filed on Feb. 12, 2007, provisional application No. 60/901,832, filed on Feb. 12, 2007.

(51) Int. Cl.
*H04M 1/66* (2006.01)
(52) U.S. Cl. .............. 455/411; 379/88.13; 455/417
(58) Field of Classification Search ............. 455/411, 455/415, 417; 379/88.13
See application file for complete search history.

(56) References Cited

U.S. PATENT DOCUMENTS

| | | | | |
|---|---|---|---|---|
| 6,662,023 B1* | 12/2003 | Helle | ............................. | 455/558 |
| 6,965,936 B1* | 11/2005 | Wipfel et al. | ................. | 709/224 |
| 7,031,443 B2* | 4/2006 | St-Onge et al. | ............ | 379/88.17 |
| 7,046,782 B2* | 5/2006 | Miller | ........................ | 379/207.14 |
| 2005/0041793 A1* | 2/2005 | Fulton et al. | ............. | 379/211.01 |
| 2005/0123137 A1* | 6/2005 | McCallum | ..................... | 380/255 |
| 2005/0170811 A1* | 8/2005 | Pelaez et al. | .................. | 455/410 |
| 2005/0175160 A1 | 8/2005 | Simpson et al. | | |
| 2005/0208933 A1* | 9/2005 | Hospes | .......................... | 455/419 |
| 2005/0268154 A1* | 12/2005 | Wipfel et al. | ...................... | 714/4 |
| 2007/0206735 A1* | 9/2007 | Silver et al. | ................ | 379/88.19 |
| 2007/0238443 A1* | 10/2007 | Richardson | ................... | 455/411 |
| 2008/0115152 A1* | 5/2008 | Welingkar et al. | ............ | 719/322 |
| 2009/0017790 A1* | 1/2009 | Thalapaneni et al. | ......... | 455/410 |
| 2009/0029676 A1* | 1/2009 | Thalapaneni et al. | ......... | 455/411 |
| 2010/0273449 A1* | 10/2010 | Kaplan | ......................... | 455/411 |

* cited by examiner

*Primary Examiner* — Charles Shedrick
(74) *Attorney, Agent, or Firm* — David H. Jaffer; Pillsbury Winthrop Shaw Pittman LLP

(57) ABSTRACT

Systems and methods are described for remotely managing mobile devices provided by an enterprise. Embodiments are described in which a client is provided to a mobile device whereby the client maintains a list of authorized contacts authorizes connections of the mobile device based on the list. The client responds to commands including commands to delete the list, prevent access to the list and synchronize the list. An administrative function is described for organizing users into groups, each user having access to a mobile device and each group being associated with a list of authorized contacts common to each user in the group.

22 Claims, 9 Drawing Sheets

(5 of 9 Drawing Sheet(s) Filed in Color)

Figure 7

SYSTEMS AND METHODS FOR MANAGING INFORMATION IN MOBILE DEVICES

CROSS-REFERENCE TO RELATED APPLICATIONS

This application claims priority from U.S. Provisional Patent Application Ser. No. 60/901,830, Filed Feb. 12, 2007, titled "Mobile Phone Information System," and from U.S. Provisional Patent Application Ser. No. 60/901,832, Filed Feb. 12, 2007, titled "Mobile Phone Voice and Data Restriction System," which applications are hereby incorporated by reference herein for all purposes. This application is also related to the concurrently filed U.S. Non-Provisional Application titled "Systems and Methods For Restricting Service In Mobile Devices," which application is hereby incorporated by reference herein for all purposes.

BACKGROUND OF THE INVENTION

1. Field of the Invention

The present invention relates generally to mobile devices and more generally to wireless management of content of mobile devices.

2. Description of Related Art

Businesses, Enterprises, Government agencies, or Organizations provide mobile phones to their employees for improving their internal communications and productivity. It is a real challenge to keep all the employee phones up-to-date with the most current and accurate information such as Contacts, Tasks, Appointments, Notes, Group Lists, Email Accounts, Setup Conditions & Privileges, Restrictions to Voice Calls & Data Usage, etc. Whenever, the information changes as it happens all the time, it does not get transmitted to all the employees unless they physically bring the phones to the office for uploading the information to the phone by IT Manager or authorized Administrator. Practically, it is impossible to keep every employee's phone up-to-date. It creates inefficiency, and chaos in communicating with each other due to erroneous information and the real purpose of productivity gain is lost.

Furthermore, businesses and government agencies often provide mobile phones to many employees to improve internal communications and productivity. However, it is difficult to prevent abuse of the phone privilege and employees frequently make very long non-business related calls and download large files of data such as pictures, audio, video. Consequently, businesses may be surprised by large telephone bills which had not been budgeted.

BRIEF SUMMARY OF THE INVENTION

Certain embodiments of the present invention comprise systems and methods for Authorized Administrator from Businesses, Enterprises, or Organizations can remotely manage their Workforce Mobile Phones and Usage in Real-time using Remoba's Administrator Web Console. Certain embodiments of the invention provide systems and methods comprising providing a client to a mobile device wherein the client is configured to maintain a list of authorized contacts on the mobile device, and authorize connection of the mobile device based on the list and transmitting at least a portion of the list of authorized contacts to the mobile device. Users may be organized into groups, each user having access to a mobile device and each group being associated with a list of authorized contacts common to each user in the group. A lockdown command can be transmitted to the mobile device to prevent access to the authorized contact list. A poison pill command to the mobile device causing destruction of data on the mobile device. In some of these embodiments, the list of authorized contacts comprises business contacts of an enterprise. In some of these embodiments, the business contacts are maintained on a system server and synchronized to the list of authorized contacts. In some of these embodiments, the business contacts are managed by an administrator. The mobile device can be a mobile phone, a computing device, etc.

BRIEF DESCRIPTION OF THE DRAWINGS

The patent or application file contains at least one drawing executed in color. Copies of this patent with color drawing(s) will be provided by the Patent and Trademark Office upon request and payment of necessary fee.

FIGS. 5-8 are screenshots showing one example of an administrator interface.

DETAILED DESCRIPTION OF THE INVENTION

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the components referred to herein by way of illustration.

Certain embodiments of the invention provide systems, methods that enable businesses to better manage employee mobile phones and content of mobile communication devices. Many of these systems and methods can be embodied using combinations of computer hardware, firmware and software that operate using communications services, often provided by third party systems. In certain embodiments, systems and methods are provided that interact with, manage and control contact lists, calendar events, tasks, Email accounts notes and other information maintained on a plurality of mobile devices. The mobile communication devices can include cellular telephones, satellite telephones, smart phones, email-enabled telephones PDAs, laptop computers and so on.

Figure 1:
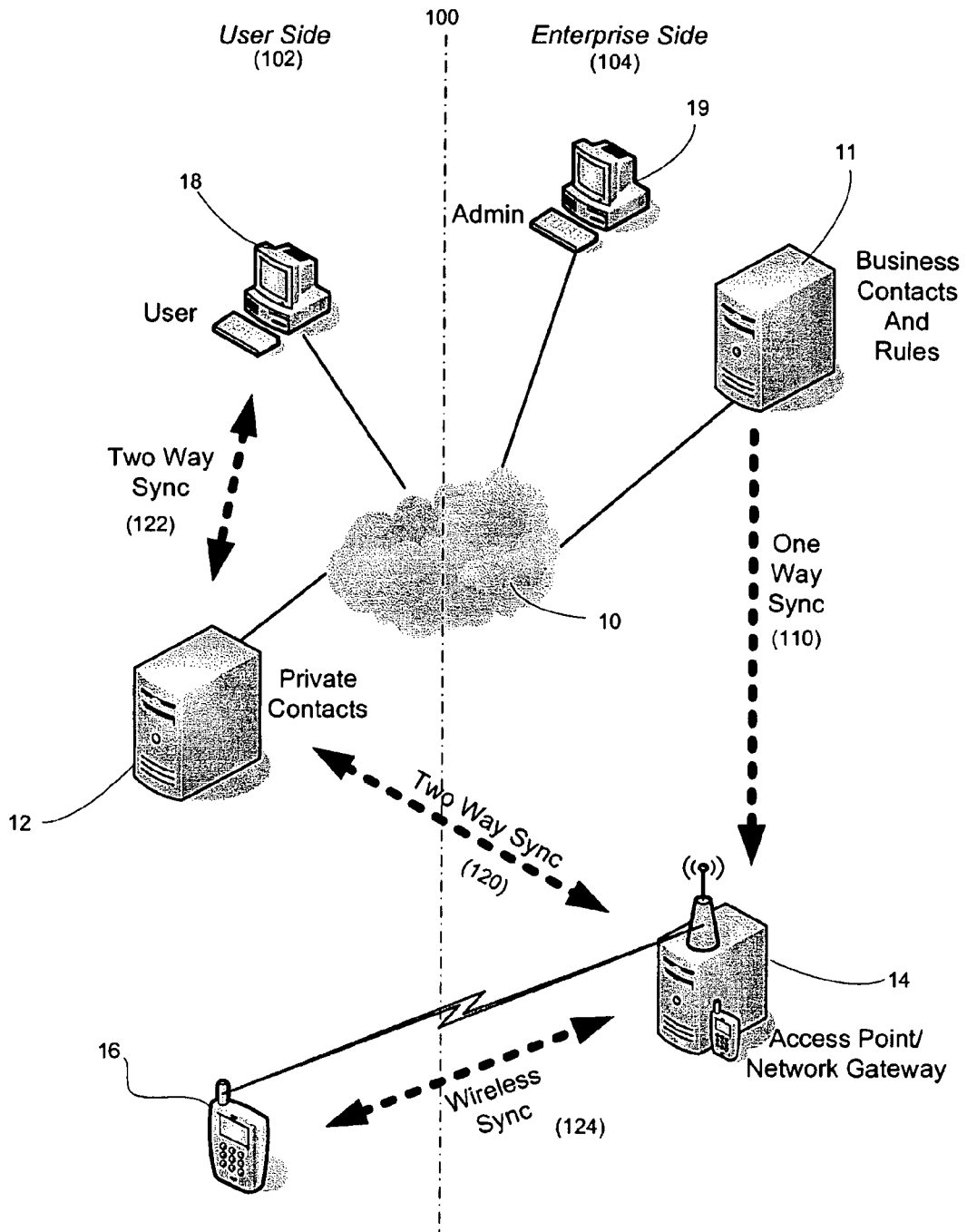
FIG. 1 is a schematic showing certain features of one embodiment of the invention.

With reference to the generalized and simplified embodiment illustrated in FIG. 1 a mobile device 16 and its content may be managed and controlled by one or more system servers 11. Mobile device 16, while depicted as telephonic in nature for the sake of simplicity, can be any wirelessly connectable communications device, including portable computers (e.g. laptops, notebooks, etc.), cellular telephones, satellite telephones, PDAs, Email clients, multimedia players and the like. Mobile device 16 may communicate using any combination of wired and wireless communications including cellular networks, Bluetooth, WiFi, Infrared, satellite, etc. and typically communicates with enterprise servers (e.g. system server 11) through a wireless access point 14 which may also provide network gateway, security, firewall and other services. Server 11 can be provided in any dedicated or shared network resource and can be embodied as a combination of hardware and software resident in a computer, custom device, network switching equipment or any other suitable host.

Typically, an administrator is authorized to manage, update and synchronize contacts, calendar, tasks, and account information associated with, provided by or generated on behalf of an enterprise such as a corporation, partnership, club, government or other association of individuals and organizations. The administrators may further have responsibility for managing one or more groups of users affiliated with the enterprise, a project of the enterprise and/or a product or service provided by the enterprise. The one or more groups of users can include subgroups that are managed independently or separately from other subgroups. The scope of responsibility of an administrator and the number of authorized administrators is typically determined by organizational structure and policies of an enterprise, association or other entity.

In certain embodiments, an account can be created and associated with a group of users in order to define and organize membership of the group and associated subgroups. The account may also identify privileges of individual members or associates of the enterprise and may track services and service levels provided to the group, billing information, contact information and the identity of administrators of the group. An administrator can typically create additional groups or sub-groups as required and can assign membership to members identified in an account. For example, in an account corresponding to a corporation, employees of the corporation can be identified in the corporate account and can be assigned to one or more sub-groups based on a variety of factors including business function, seniority, department corporate division, etc. The administrator may set different privileges and access rights to each member of groups and sub-groups. A history of activities associated with the group may be maintained for the account.

In certain embodiments, membership of groups follows a business organization of the enterprise. The groups can comprise users based on business function, reporting structure, geographical location and/or membership of a task force or project team. In at least some embodiments, a user may belong to more than one group and a list of authorized contacts corresponding to the user may modified in an additive or subtractive manner as dictated by the nature of the groups. For example, a user may belong to a nationwide project group as well as a local group having similar function (e.g. the user may be an engineer on a corporate wide task force). In the latter example, contacts related to individual members of both groups may be added the user's authorized contact list. However, a local supplier contact may be deleted to be replaced by a supplier selected for the purpose of the task force.

A network 11 connecting the systems servers 10 to workstations 18, 19 and other servers 12 and 14. The network 11 may be based on the internet or other public network, but may equally be based on a private or semi-private network using, for example, dedicated services provided by public carriers. The network 10 is effectively divided at 100 into enterprise 104 and external or user 102 portions. Division 100 is typically a virtual division created using secured communications channels, particularly on the enterprise side 104. Communications channels may be secured using any combination of devices and software including firewalls, encryption or any mechanisms, methods and systems suitable for securing the channels to the degree required for the application and enterprise. Administrative workstations 19 are typically found on the enterprise side 104 of the network 10 while user workstations 18 can be located anywhere in the network contingent on the functions to be performed and security policies of the enterprise.

In certain embodiments, an administrator with sufficient account privileges can create a custom webpage on the one or more system servers 11 for controlling and managing a plurality of mobile devices 16. It will be appreciated that such webpage or its equivalent may be created elsewhere (e.g. workstation 19) and subsequently copied to the system servers 11 as desired. System servers 11 may be maintained by an enterprise but in some embodiments, system servers 11 may be maintained externally or internally to the enterprise network by a third party provider such as Remoba Inc. of Santa Clara, Calif.

In certain embodiments, an account may be associated with a corresponding console, typically customized to the account, that interacts with a plurality of applications resident in a plurality of mobile devices 16. The console typically executes on the one or more central servers 11 to facilitate access to enterprise data and policies, but such collocation is not required and the console function can be spread over several host devices. The degree and manner of interaction between console and mobile device 16 can be configured by the administrator such that the console implements rules and policies associated with the account. Mobile software applications can be wirelessly downloaded to mobile device 16 using a catalogue service and/or from content delivery servers (not explicitly shown). In one example, commercially available applications such as Remoba Inc. products including RemoSync, iphonebook, iDatebook, and RemoMail can be provided to mobile device 16 and managed by the system server 11.

In certain embodiments, access to enterprise data may be controlled based on group membership. For example, members of a group associated with an accounting department may be permitted access to supplier and customer contact information while a group of managers in a manufacturing division may be permitted access to supplier contact information only. Individuals and/or groups of users may be expressly restricted from accessing certain data and data types. For example it may be necessary to restrict access to personnel records to members of a human resources department or group. Thus shared information may be associated with a set of access rules. Access controlled information may include contact lists, calendar events, tasks, and account information for account members.

Plural administrators can be assigned to manage user groups and corresponding privileges to access shared data. Supervisory administrators or "super" administrators can be designated whereby a super administrator may delegate authorization and control to group administrators. Thus, a hierarchical management structure may be created that typically reflects the organizational structure of the enterprise.

In certain embodiments, changes made to account-related information may be disseminated to group members according to predefined rules and protocols. For example, the predefined rules may mandate immediate or earliest opportunity dissemination of certain high priority information and scheduling exchange of other less-critical information at regular and/or cumulative updates. Changes may be transmitted automatically, according to a predefined schedule and/or by command of an administrator.

In certain embodiments, updates to mobile device 16 are transparent to the user of the device 16. Similarly, information generated by the user or the user device 16 can be synchronized with central repositories of information including system server 11. Synchronization of information and updates of user devices 16 are typically performed between mobile user devices and a central database or repository and an administrator can selectively activate, deactivate and prioritize real-time wireless synchronization 124 of the data to any individual user device 16 or group of devices 16. Thus, the most up-to-date information can be efficiently provided to group members based on organizational priorities.

As discussed above, data synchronization between mobile device 16 and system server 11 may be bi-directional in nature. In certain embodiments, users may enter, modify or delete shared information. The changes made by users may then be replicated on a central server 11 and disseminated to other user devices 16. Typically, a user is permitted to modify, add or delete shared information only if the user has sufficient system privileges for the information to be changed. For example, users or groups of users may be owners of the information with full permission to modify or delete the information. Users or groups of users may be afforded edit privileges with regard to certain data that permits modification or addition of information but not deletion. Certain users may be permitted to read information only, without the ability to modify the information directly. A user having insufficient privilege to change data may submit request to change the data to an administrator or data owner; the request may be in the form of an edited copy of the data.

Various types and operation of access privilege are contemplated based on specific application of the systems and methods described. For example, other classes of access privilege may be provided including a local copy privilege which permits alteration and maintenance of copies of data disseminated by central server. Local copy privilege permits a user to modify data or portions of data for local use but prohibits the propagation of the changes to servers and other users. Furthermore, access privileges may include a time component that sets different access levels for users and groups of users based on time of day, day of week, week of month and so on. Such time-sensitive privilege may also be granted for a fixed period of time and may expire or revert after a predetermined date or time.

In certain embodiments, a user may make entries at a workstation 18 or on the mobile device 16. The user may also cause certain private contact and other information 12 to be synchronized 120 and 124 with the mobile device while synchronizing 110 of enterprise contacts and other data may be limited to one-way synchronization. In this manner, user-private information may be maintained independently of enterprise data and combined only under administrator control.

As mentioned above, where a business entity has multiple departments, each department can be managed by a designated departmental administrator. In certain embodiments, departmental administrators can be controlled by an administrator with additional privilege (e.g. a "Super Administrator" and, where necessary, an administration hierarchy can be implemented as required to properly manage a user base. Administrator privileges typically permit an administrator to perform a range of management and security-oriented functions. Administrators can selectively lock down mobile devices 16 such that the mobile device 16 is incapable of initiating and/or receiving certain voice calls and data transmissions. For example, lockdown may prevent access to a corporate contact list maintained on the wireless device and may further prevent calls to telephone numbers in the contact list. In certain embodiments, calls received at the mobile device 16 from numbers identified in the enterprise contact list may be blocked or redirected to another telephone number or network address during lockdown.

In certain embodiments, administrators can send a "Poison Pill" command to initiate destruction of all information on the mobile device 16. It is contemplated that such command may be sent subsequent to loss or theft of a mobile device 16, resignation or dismissal of an employee or detection or suspicion of misuse of the mobile device 16. In certain embodiments, the administrator may also cause a lockdown command to be sent to a mobile device. The lockdown command may change a user's privilege level thereby preventing the user from accessing shared data and may partially or completely inhibit use of the mobile device 16. In certain embodiments, a standing lockdown command may be in effect at one or more mobile devices 16 whereby access to protected data on the device 16 may be blocked unless a release command is received by the device 16. For example, a release command may be sent periodically to a mobile device 16 in the form of an updated delayed lockdown command. The delayed lockdown command may specify that access to portions of the data are permitted for a period of time, typically measured in minutes, hours, days or weeks as necessary. After the specified time period expires, lockdown and/or deletion of the data may occur. In certain embodiments, lockdown can be implemented as partial or total restriction to data on a mobile device 16 and may include a data erasure process that generates a poison pill command.

In certain embodiments, lockdown can be used to control and affect the operation of a mobile device 16 and may be used to restrict service of a cellular phone or mobile computing device, etc. Service restriction can include disabling or restricting call initiation and call reception in a variety of manners and may include the use of system components deployed in access points of wireless service providers. In one embodiment, a lockdown command may restrict access to a repository of telephone numbers provided by the enterprise controlling the device. The enterprise telephone numbers may be maintained in an encoded or encrypted manner on the mobile device such that a user electing to call the enterprise number may not see the actual number dialed. Thus, when access to the enterprise numbers is blocked by a lockdown command or for failure of user authentication, the desired number will not available for dialing. Furthermore, a different number could be substituted that causes the device to call a security system to report the attempted call and/or to receive further commands from the system.

In certain embodiments, service restriction can be implemented to limit the use of the mobile device 16 to a list of authorized numbers. The service may be limited to numbers provided to members of a group within the enterprise and can be limited based on the individual user of the mobile device 16. In one example, service may be restricted to local calling, in-state calling or group calling except for specific predefined numbers controlled by an administrator using a system of servers or control devices. Restricting service to local calls may be accomplished using a client application and/or a customized mobile device 16 that includes the client. The client can be used to intercept keyed entries by the user and can perform a variety of authorization and lookup functions. In one example, the client may permit the user to select from an authorized directory and may prevent entry of numbers requiring calls beyond a predefined calling zone.

In certain embodiments, restrictions on data transfers to and from mobile devices 16 may be configured. Data transfers may be initiated using SMS or other messaging systems, web browsers, video and multimedia streaming, Email and so on. Data transfer restrictions may be enforced in any of a number of ways. In one example, data transfer volumes can be monitored and restricted such that a user may not transfer data in excess of a cumulative limit and/or may not transmit or receive data objects larger than a predefined size. Address restrictions may also be imposed to limit the number and type of communication partners available to a user of the mobile device 16. These restrictions are typically managed by an administrator in a manner similar to that described for phone number management. In that regard, an administrator may impose limits on the volume of voice calls, the quantity of data or some combination of calls and data that can be sent or received from a mobile device 16.

In certain embodiments, client applications may be used to authenticate users and enforce policies set by the system and the system administrators. Client applications may be provided to the mobile device 16 using a registration process described in more detail below. Certain mobile devices 16 may be customized to provide client services without the need for installation of client applications. Thus, the client may be implemented as a combination of hardware and software components in a mobile device 16. For example, encryption may be provided as part of a storage system on the device 16 whereby access to stored data can be prevented by the storage device unless proper authentication is provided by other client functions. In certain embodiments, the client cooperates with an authentication server to identify a user seeking to use the device. The user may provide identification and passwords or may be identified by biometric means available to the mobile device including, for example, fingerprint reader, iris scanner, etc.

The mobile device 16 may maintain sufficient information to authenticate the user without system participation, such information having been previously provided by the authentication or other server. In some embodiments, the mobile device may relay identifying information to the authentication server for confirmation of the user credentials. Upon authentication, the client typically retrieves access rules associated with the user from local storage or from an administrating device. In some embodiments, the rules can be retrieved upon first authentication of the user and may be updated during subsequent usage of the device by the user.

Figure 3:
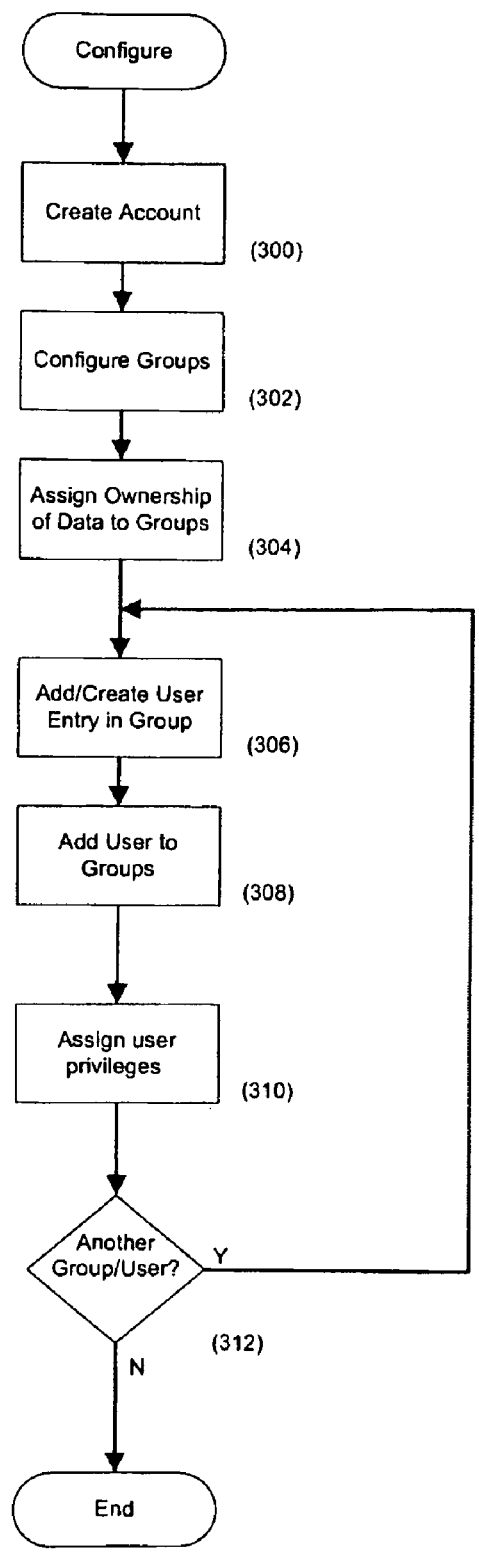
FIG. 3 is a flowchart illustrating certain administrative operations in one embodiment of the invention.

FIG. 3 is a flowchart illustrating a simplified registration process followed by an administrator in creating a new account and user information. At step 300, an account is created. Account creation typically comprises establishing information identifying ownership of data and users of the data as well as establishing administrative privileges of the account administrator. The administrator may also create a web page on a server for controlling user devices and managing synchronization of data. At step 302, users may be assigned group memberships that are typically related to function and position within the enterprise. At step 304, access privileges are assigned to the group or groups created. Access privileges may be granted by assigning ownership of certain data to groups or subgroups and providing access to other groups as determined by enterprise policy or need. The administrator may then add users to the groups at step 306. Adding users may include creation and of new user profiles and modification of existing user profiles. User profiles can be created manually or added by importing one or more preexisting contact lists, typically provided in a commonly recognized format, such as comma separated variable or other file type. At step 308, the administrator can create new groups and populate groups of users that reflect the organization of the enterprise. At step 310, the administrator may assign additional privileges or limit group privileges of each user in the group. At step 312, additional users can be created or added to groups and certain users may be added to additional groups.

Figure 2:
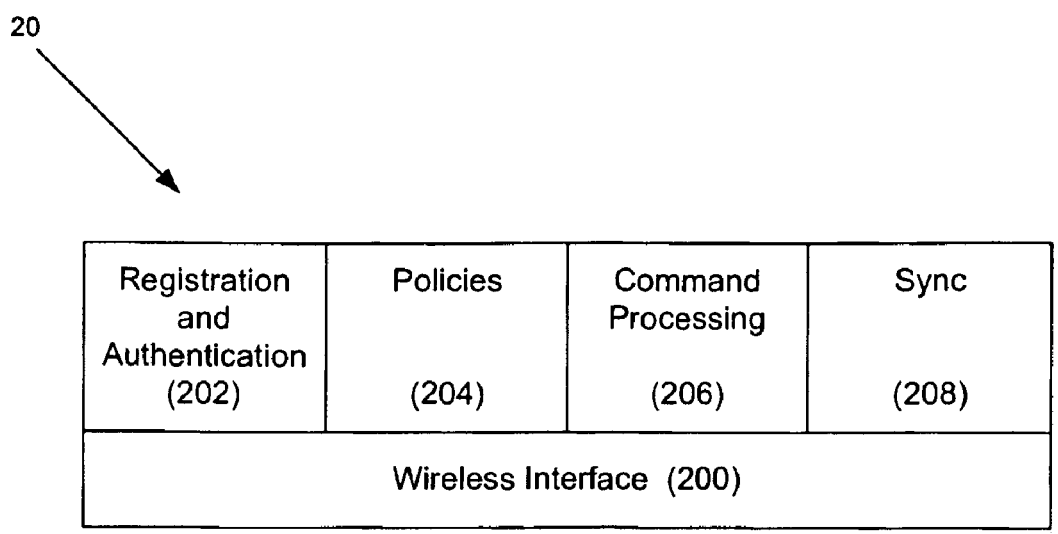
FIG. 2 is a block diagram of a client provided to mobile devices in certain embodiments of the invention.
Figure 4:
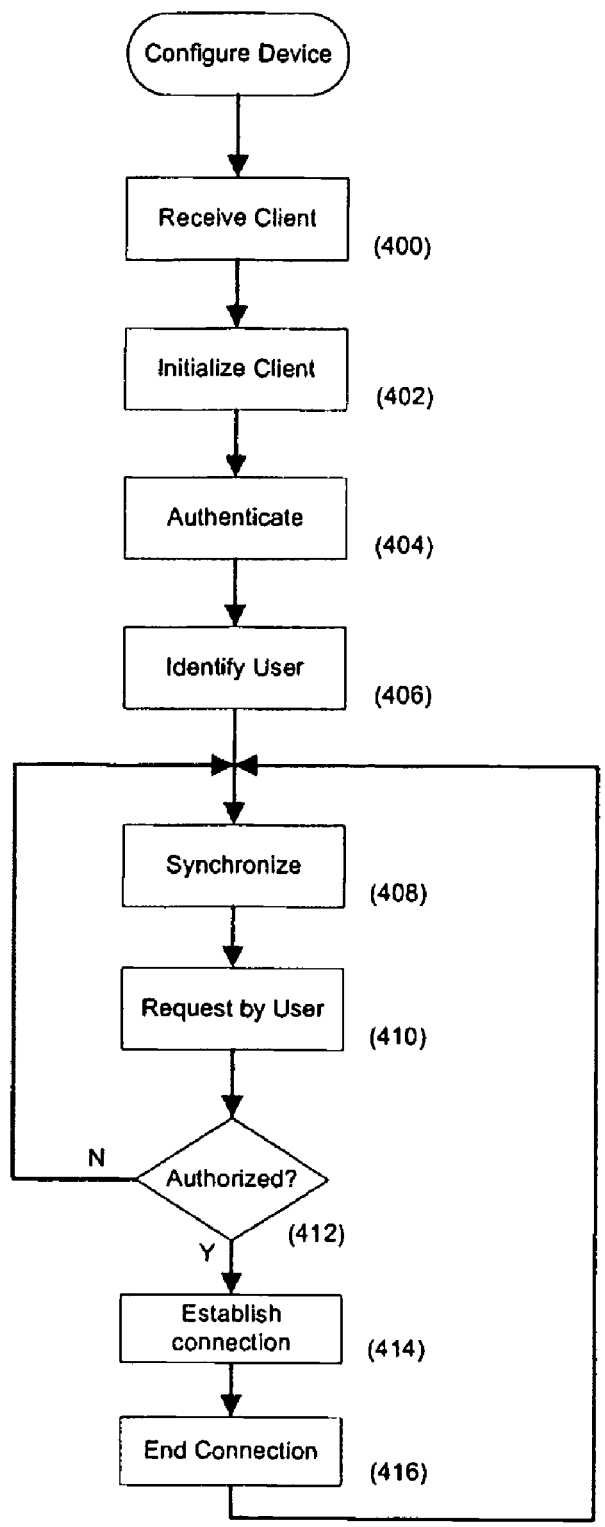
FIG. 4 is a flowchart illustrating certain aspects of mobile device configuration.

Turning now to FIGS. 2 and 4, a simplified description of a process for initializing a mobile device 16 is described. The mobile device 16 can be any device capable of communicating wirelessly including cellular telephone, satellite telephone, PDA, mobile computing platform, multimedia player, gaming device and son on. The mobile device can receive and execute a client application 20 at step 400, the client 20 facilitating operation of the device according to certain aspects of the inventions. In some embodiments, the client 20 or portions of the client 20 may be predisposed within the mobile device as a combination of hardware and software components. In some embodiments, the client 20 may be provided on removable storage such as a SIM chip, a smartcard, smart chip and/or on a preconfigured storage device. The client 20 typically provides components that support sharing of protected enterprise data. These components can include registration and authentication instructions and data 202, policies and policy enforcement 204, an executive 206 for receiving, decoding and executing commands received from a system server 11, a synchronizer 208 and interface components for augmenting and customizing wireless communications 200, typically used for enforcing policies according to certain aspects of the invention. The components, alone or in combination, can be used to implement certain high level functions, processes, operations, tools and applications. The components may handle a downloaded product that manages certain data types such as the RemoBiz, RemoMail, iphonebook and iDatebook applications mentioned above. The components may permit execution of business applications such as decision support systems, Email, contact lists and directories and calendaring applications. It will be appreciated that various applications may be downloaded wirelessly although many downloads can be accomplished using a wired connection between wireless device and a host computer or through removable storage systems.

At step 402, the client 20 can be initialized during first use of the mobile device 16 by an authorized user. In one example, first use is determined when the user provides identification, often in the form of a PIN or other code. Verification of the PIN may be based on information previously stored in the mobile device 16 but may also require performing an authentication process with the system at step 404. The authentication process may include an exchange of keys, for example. Upon authentication and at step 406, the user may provide certain identifying and customizing data for use on the mobile device 16, particularly where the phone may maintain multiple user profiles.

At step 408, the mobile device is synchronized with one or more system servers 11. Synchronization typically causes the loading of new or additional contact information, calendaring events, Email, etc. and may also include the deletion of certain information. Additionally, synchronization can include the download and initiation of applications to the mobile device 16 as well as commands from the system servers 11. At this point, the mobile device performs according to certain aspects described above and a user may establish and receive calls as authorized by the enterprise system. In certain embodiments, an action of the user may initiate a system request at step 410. The system request may comprise a request to call a telephone number in a different area code or an attempt to access the Internet, for example. The system request may necessitate performance of a system service such as a synchronization of private or enterprise data, a change of authorization or an intervention of an administrator. Typically, the system request may be fulfilled by creating a connection between the mobile device 16 and a desired destination or between the mobile device 16 and a system component and where authorized at step 412, such connection is established at step 414. If the system request cannot be authorized at step 412 or requires no connection, then the mobile device may be resynchronized at step 408 before resuming normal operation. Upon completing one or more transactions at step 414, connections can be broken down at step 416 before resynchronization of the mobile device 16 at step 408 as necessary or desired.

As noted above, authorization to assign or modify the enterprise data or related information is reserved for an administrator and enterprise information typically cannot be modified by users for upload during synchronization. However, in certain embodiments, it may be desirable to notify an administrator of desired changes in order to facilitate update of enterprise data. Based on the privileges assigned to individual users, private information such as contacts, calendar, and non-corporate email accounts can be maintained on the mobile device. Such private information can be updated using a two-way synchronization process involving systems servers 11 and the mobile device.

With regard to commands issued during synchronization and described as executed using the client command processor 206, these commands can include a wide variety of functions. An administrator can typically prioritize the commands and, at the highest priority level, can push certain commands to the mobile device 16 at the earliest opportunity. The earliest opportunity may be created during a periodic contact by the mobile device 16 but the system may also contact the device using network access point protocols or by establishing a "dialed" connection with the device in order to transmit the commands. Commands may be used to schedule or initiate updates related to contacts, events, tasks, account information. Commands may also include security related commands such as the poison pill command described above and that causes the mobile device 16 to erase stored information such as contacts, calendar events, archives, email accounts, images, audio/video files.

Figure 5:
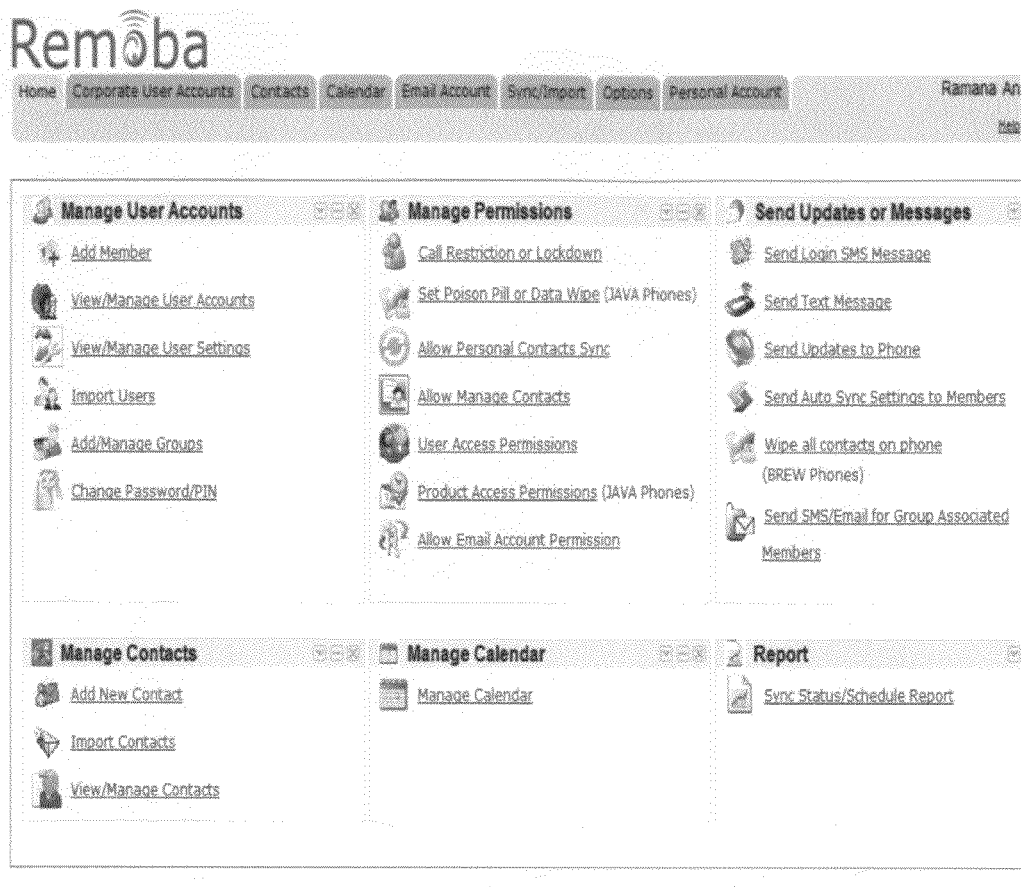
Figure 6:
Figure 7:
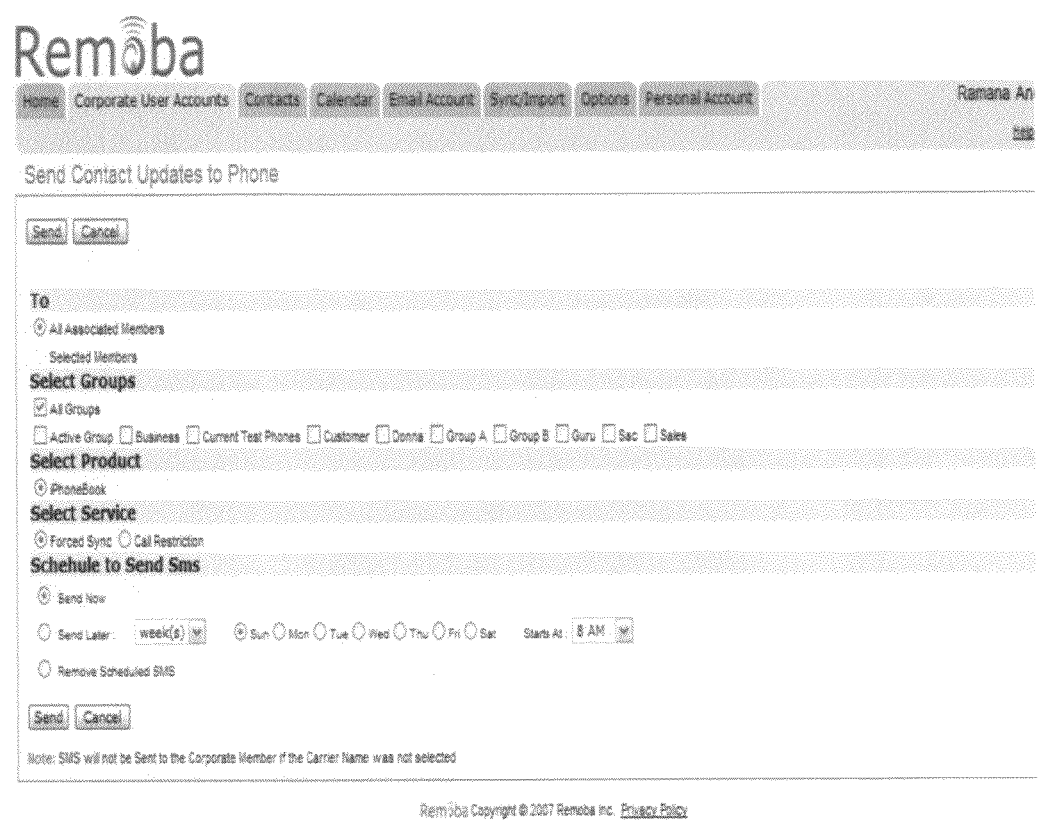
Figure 8:
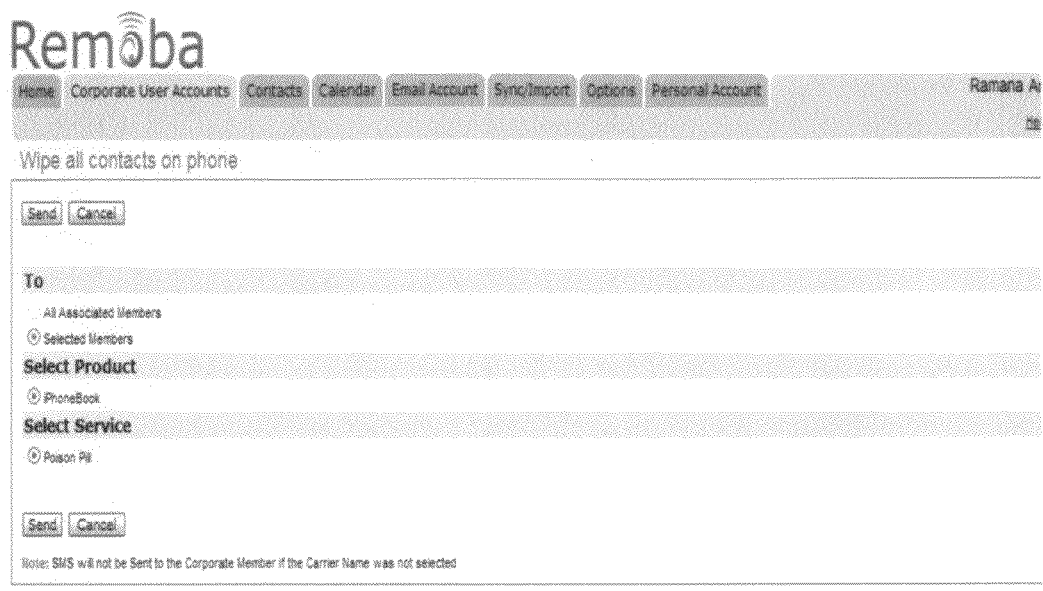
Figure 9:
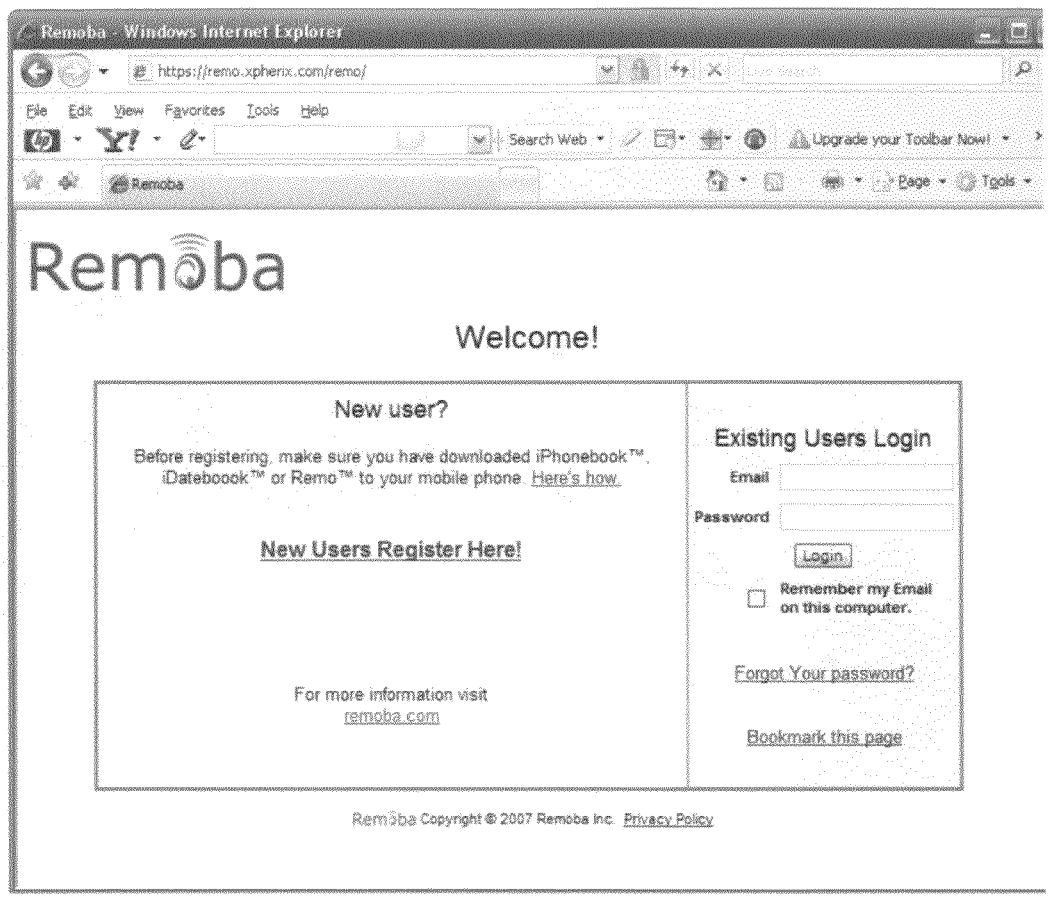
FIG. 9 is a screenshot showing a user greeting display.

In certain embodiments, administrators may control enterprise data and the operation of mobile devices using a networked application, typically interfaced using a web page. FIGS. 5-9 illustrate the operation of one embodiment of the invention. FIG. 5 depicts a dashboard or main menu for selecting an administration function and FIG. 6 illustrates a panel for selecting a user or group of users and a list of functions and operations that can be performed on the mobile devices of the selected users. FIGS. 7 and 8 shows how commands can be configured; in the examples, FIG. 7 shows a contact updates command and FIG. 8 shows a poison pill type command configuration. Additionally, FIG. 9 shows one example of a welcome screen provided to users of the system. The user may enter the system to perform administrator operations—if so authorized—to manage the user account or to register as a new user.

In certain embodiments, an interface provided to the administrator may be identified as a "business administrator dashboard for mobile phone control," in the example of a cellular phone management system. This dashboard can be a business-specific web page hosted on one or more servers. An administrator can use the dashboard to create, organize, assign privileges and manage employee information such as contacts, calendar, tasks, Email accounts, notes, etc. Typically, an administrator communicates through the dashboard to user devices and can send a variety of commands including restriction commands such as "Lockdown," "Poison Pill" and others. Restriction commands can be configured to apply all features of mobile devices and to individual user devices or groups of user devices. In one example, the user devices may include mobile phones, feature phones, smart phones and so on.

In one example, XYZ Inc. is a food distribution company with 200 truck drivers located at its Santa Clara, Calif. Office. XYZ management has decided to provide mobile phones to all the drivers to keep track of operations in real time. Since a high turnover of truck drivers exists, an embodiment of the presently described invention is employed to permit an office manager to wirelessly update contacts and appointments for all drivers employed by XYZ. Updates may be made in real-time irrespective of the frequency of changes by using a business administrator web page. An administrator can also control phone usage using the lockdown feature and can wipeout all the business related information on any employee phone if the employee is separated from employment or if the phone is lost.

Additional Descriptions Of Certain Aspects Of The Invention

Certain embodiments of the invention provide systems and methods comprising providing a client to a mobile device wherein the client is configured to maintain a list of authorized contacts on the mobile device, and authorize connection of the mobile device based on the list and transmitting at least a portion of the list of authorized contacts to the mobile device. Some of these embodiments further comprise identifying a group of users, each user having access to a mobile device and associating a list of authorized contacts common to each user in the group, wherein for each user in the group, a corresponding client is configured on a mobile device. Some of these embodiments further comprise transmitting a lockdown command to at least one mobile device, wherein the lockdown command prevents access to the authorized contact list. Some of these embodiments further comprise transmitting a poison pill command to at least one client, the poison pill causing destruction of data on the corresponding mobile device. In some of these embodiments, the list of authorized contacts comprises business contacts of an enterprise. In some of these embodiments, the business contacts are maintained on a system server and further comprising synchronizing the list of authorized contacts with the business contacts in response to a change in the business contacts. In some of these embodiments, a different list of authorized contacts is provided to different mobile devices based on group membership of the different members. In some of these embodiments, the synchronizing is performed on selected mobile devices, the selected mobile devices being associated with at least one group of users. In some of these embodiments, the business contacts are managed by an administrator and further comprising transmitting a lockdown command to at least one mobile device, wherein the lockdown command is transmitted by the administrator and prevents access to the authorized contact list. In some of these embodiments, the business contacts are managed by an administrator and further comprising transmitting a poison pill command to at least one client, the poison pill causing destruction of data on the corresponding mobile device, wherein the poison pill command is transmitted by the administrator and prevents access to the authorized contact list. In some of these embodiments, the mobile device is a mobile phone. In some of these embodiments, the mobile device is a computing device. In some of these embodiments, the client is further configured to prevent connection of the mobile device with an unauthorized contact. In some of these embodiments, preventing connection includes receiving a request from a user of the mobile device to initiate a call to a destination and determining that the destination is not listed as an authorized contact in the list of authorized contacts. In some of these embodiments, preventing connection includes receiving an incoming call to the mobile device and determining that the originator of incoming call is not listed as an authorized contact in the list of authorized contacts.

Certain embodiments of the invention provide systems, methods and apparatus comprising a list of business contacts maintained on a server and a client provided to a mobile device wherein the client is configured to maintain a list of authorized contacts on the mobile device, and permit connection of the mobile device based on the list, wherein the list of authorized contacts comprises at least a portion of the list of business contacts, and wherein the list of authorized contacts is different for different ones of a plurality of users. In some of these embodiments, certain of the plurality of users are organized into groups, each group being associated with at least some authorized contacts common to the group members. In some of these embodiments, membership of the groups is determined by an administrator based on business function of the group members.

Although the present invention has been described with reference to specific exemplary embodiments, it will be evident to one of ordinary skill in the art that various modifications and changes may be made to these embodiments without departing from the broader spirit and scope of the invention. Accordingly, the specification and drawings are to be regarded in an illustrative rather than a restrictive sense.

What is claimed is:

1. A method, comprising:
providing a client to a mobile device wherein the client is configured for execution on the mobile device and thereby to
maintain a list of authorized contacts on the mobile device, and to authorize connection of the mobile device based on the list of authorized contacts; and
transmitting at least a portion of the list of authorized contacts to the mobile device, wherein
the client is configured to respond to a restriction command received from a network server by preventing a user of the mobile device from accessing the list of authorized contacts, and
the client is configured to respond to a release command received from a network server, subsequent to the restriction command, by allowing the user of the mobile device to access the list of authorized contacts.

2. The method of claim 1, and further comprising:
identifying a group of users, each user having access to a mobile device; and
associating a list of authorized contacts common to each user in the group, wherein
for each user in the group, a client is provided during a registration process to the mobile device that is accessible to the each user.

3. The method of claim 2, and further comprising causing an enterprise server to transmit a restriction command to at least one mobile device, wherein the restriction command is a lockdown command that causes the agent to prevent access to the authorized contact list on the at least one mobile.

4. The method of claim 2, and further comprising causing a network server to transmit a restriction command to at least one client, wherein the restriction command includes a poison pill command that causes the agent to destroy data on the corresponding mobile device.

5. The method of claim 1, wherein the list of authorized contacts comprises business contacts of an enterprise.

6. The method of claim 5, wherein the business contacts are maintained on a system server and further comprising synchronizing the list of authorized contacts with the business contacts in response to a change in the business contacts.

7. The method of claim 6, wherein a different list of authorized contacts is provided to different mobile devices based on group membership of the different members.

8. The method of claim 6, wherein the synchronizing is performed on selected mobile devices, the selected mobile devices being associated with at least one group of users.

9. The method of claim 6, wherein the business contacts are managed by an administrator and further comprising causing a network server to transmit a lockdown command to at least one mobile device, wherein transmission of the lockdown command is initiated by the administrator and prevents access to the authorized contact list.

10. The method of claim 6, wherein the business contacts are managed by an administrator and further comprising causing a network server to transmit a poison pill command to at least one client, the poison pill causing destruction of data on the corresponding mobile device, wherein transmission of the poison pill command is initiated by the administrator and the poison pill command prevents access to the authorized contact list.

11. The method of claim 1, wherein the mobile device is a mobile phone.

12. The method of claim 1, wherein the mobile device is a computing device.

13. The method of claim 1, wherein the client is further configured to prevent connection of the mobile device with an unauthorized contact.

14. The method of claim 13, wherein preventing connection includes:
receiving a request from a user of the mobile device to initiate a call to a destination; and
determining that the destination is not listed as an authorized contact in the list of authorized contacts.

15. The method of claim 13, wherein preventing connection includes:
receiving an incoming call to the mobile device; and
determining that the originator of incoming call is not listed as an authorized contact in the list of authorized contacts.

16. A system, comprising:
a list of business contacts maintained on one or more servers; and
a client provided to a mobile device by one of the one or more servers during a registration process, wherein the client when executed on the mobile device causes the mobile device to:
maintain a list of authorized contacts on the mobile device, permit connection of the mobile device based on the list, and prevent a user of the mobile device from accessing the list of authorized contacts after receiving a restriction command transmitted to the mobile device by one of the one or more servers, and allow the user of the mobile device to access the list of authorized contacts after receiving a release command transmitted to the mobile device by one of the one or more servers, wherein the list of authorized contacts comprises at least a portion of the list of business contacts, and wherein the list of authorized contacts is different for different ones of a plurality of users, and wherein calls for the mobile device are redirected to a different mobile device while the client is preventing the user from accessing the list of authorized contacts.

17. The system of claim 16, wherein certain of the plurality of users are organized into groups, each group being associated with at least some authorized contacts common to the group members.

18. The system of claim 16, wherein membership of the groups is determined by an administrator based on business function of the group members.

19. The system of claim 16, wherein access to the list is blocked by the client in response to a lockdown command received by the client.

20. The system of claim 16, wherein the list is deleted by the client in response to a poison pill command received by the client.

21. The method of claim 3, further comprising redirecting a call for the at least one mobile device to a different mobile device, after the enterprise server has transmitted the restriction command to the at least one mobile device.

22. The method of claim 4, further comprising redirecting a call for the corresponding mobile device a different mobile device, after the enterprise server has transmitted the restriction command to the at least one client.

* * * * *